US006993366B2

(12) United States Patent
Kim

(10) Patent No.: US 6,993,366 B2
(45) Date of Patent: Jan. 31, 2006

(54) PORTABLE TELEPHONE, CONTROL METHOD THEREOF, AND RECORDING MEDIUM THEREFOR

(75) Inventor: Yu-hyok Kim, Seongnam-si (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 467 days.

(21) Appl. No.: 10/243,651

(22) Filed: Sep. 16, 2002

(65) Prior Publication Data

US 2003/0157969 A1    Aug. 21, 2003

(30) Foreign Application Priority Data

Feb. 18, 2002  (KR) .................................. 2002-8463

(51) Int. Cl.
*H04M 1/00* (2006.01)

(52) U.S. Cl. .................................. 455/569.1; 455/550.1; 455/575.1; 455/575.3; 379/433.02; 379/433.03

(58) Field of Classification Search ...... 455/90.1–90.3, 455/95, 563, 566, 569.1, 575, 575.3, 575.1; 379/433.01, 433.02, 433.03, 433.11, 433.12, 379/433.13; 381/92, 104, 107, 110

See application file for complete search history.

(56) References Cited

U.S. PATENT DOCUMENTS

| 5,535,433 | A  | * | 7/1996  | Kurokawa et al. ............. 455/79 |
| 5,673,327 | A  | * | 9/1997  | Julstrom ..................... 381/119 |
| 6,014,573 | A  | * | 1/2000  | Lehtonen et al. ........ 455/569.1 |
| 6,321,080 | B1 | * | 11/2001 | Diethorn ..................... 455/416 |
| 6,389,267 | B1 | * | 5/2002  | Imai ........................... 455/90.1 |
| 6,487,396 | B1 | * | 11/2002 | Sassi ......................... 455/90.1 |
| 6,658,274 | B1 | * | 12/2003 | Yang ....................... 455/575.1 |
| 6,757,397 | B1 | * | 6/2004  | Buecher et al. ............. 381/122 |

FOREIGN PATENT DOCUMENTS

| JP | 2000-151453 A | 5/2000  |
| JP | 2001-285433 A | 10/2001 |

* cited by examiner

*Primary Examiner*—Temica Beamer
*Assistant Examiner*—Anthony S. Addy
(74) *Attorney, Agent, or Firm*—Sughrue Mion, PLLC

(57) ABSTRACT

A portable telephone, a control method thereof, and a recording medium are provided. The portable telephone operates a plurality of microphones and speakers included in a voice input/output unit, senses and compares voice signals, which are input through the plurality of microphones, and controls the outputs of the plurality of microphones and speakers based on the result of the comparison. Accordingly, a user can conveniently hold a conversation over the portable telephone regardless of the position or direction, in which the user holds the portable telephone.

12 Claims, 5 Drawing Sheets

PORTABLE TELEPHONE, CONTROL METHOD THEREOF, AND RECORDING MEDIUM THEREFOR

BACKGROUND OF THE INVENTION

1. Field of the Invention

The present invention relates to a portable telephone, and more particularly, to a portable telephone through which a user can have a conversation regardless of the position or direction of the portable telephone, a control method thereof, and a recording medium therefor. The present application is based on Korean Patent Application No. 2002-8463, filed Feb. 18, 2002, which is incorporated herein by reference.

2. Description of the Related Art

As portable telephones are widely used and the number of users is increasing, the types of demands of the users varies. Accordingly, portable telephones have various functions. Particularly, since younger people generally favor small-sized portable telephones, a folder type composed of an upper part and a lower part is employed in order to decrease the size of portable telephones.

Conventional portable telephones have a speaker and a microphone at opposite ends thereof regardless of whether they are folder type or normal type, so users can satisfactorily hold a conversation over portable telephones only when they hold portable telephones in a certain direction, in which a speaker is positioned close to a user's ear and a microphone is positioned close to the user's mouth.

As described above, according to conventional portable telephones, users need to hold portable telephones in a certain direction to hold a conversation. When a user picks up a portable telephone in the wrong direction, the user cannot avoid the hassle of changing the positioning of it to hold a smooth conversation.

SUMMARY OF THE INVENTION

To solve the above-described problems, it is a first object of the present invention to provide a portable telephone allowing a user to hold a smooth conversation regardless of the direction in which the user holds it.

It is a second object of the present invention to provide a method of controlling a portable telephone, which has a plurality of speakers and a plurality of microphones so that a user can hold a conversation through the portable telephone regardless of the direction in which the user holds it.

It is a third object of the present invention to provide a recording medium, in which a program is recorded for controlling a portable telephone that has a plurality of speakers and a plurality of microphones so that a user can hold a conversation over the portable telephone regardless of the direction in which the user holds it.

To achieve the first object of the present invention, in one embodiment, there is provided a portable telephone including a voice input/output unit comprising a plurality of microphones and speakers; a voice signal sensor for sensing voice signals input through the plurality of microphones; and a controller for controlling the outputs of the plurality of microphones and speakers based on the sensed voice signals.

In another embodiment, there is provided a folder-type portable telephone having an upper part and a lower part. The folder-type portable telephone includes a voice input/output unit comprising first and second microphones and first and second speakers; a voice signal sensor for sensing voice signals input through the first and second microphones; and a controller for comparing the magnitudes of the sensed voice signals, enabling a microphone, through which a voice signal having a larger magnitude is input, and a speaker corresponding to the microphone, and disabling the remaining microphone and speaker.

To achieve the second object of the present invention, in one embodiment, there is provided a method of controlling a portable telephone. The method includes operating a plurality of microphones and a plurality of speakers, which are installed in the portable telephone; comparing the magnitudes of voice signals, which are input through the plurality of microphones; and controlling the outputs of the plurality of microphones and speakers based on the result of the comparison.

In another embodiment, there is provided a method of controlling a portable telephone. The method includes enabling a plurality of speakers, which are installed in the portable telephone, when an outgoing call connection is requested; enabling a plurality of microphones, which are installed in the portable telephone, when the call connection is made; sensing and comparing voice signals which are input through the plurality of microphones; and controlling the outputs of the plurality of microphones and speakers based on the result of the comparison.

To achieve the third object of the present invention, there is provided a recording medium in which a program for executing the steps of operating a plurality of microphones and a plurality of speakers, which are installed in the portable telephone; comparing the magnitudes of voice signals, which are input through the plurality of microphones; and controlling the outputs of the plurality of microphones and speakers based on the result of the comparison.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Hereinafter, preferred embodiments of the present invention will be described in detail with reference to the attached drawings.

Figure 1:
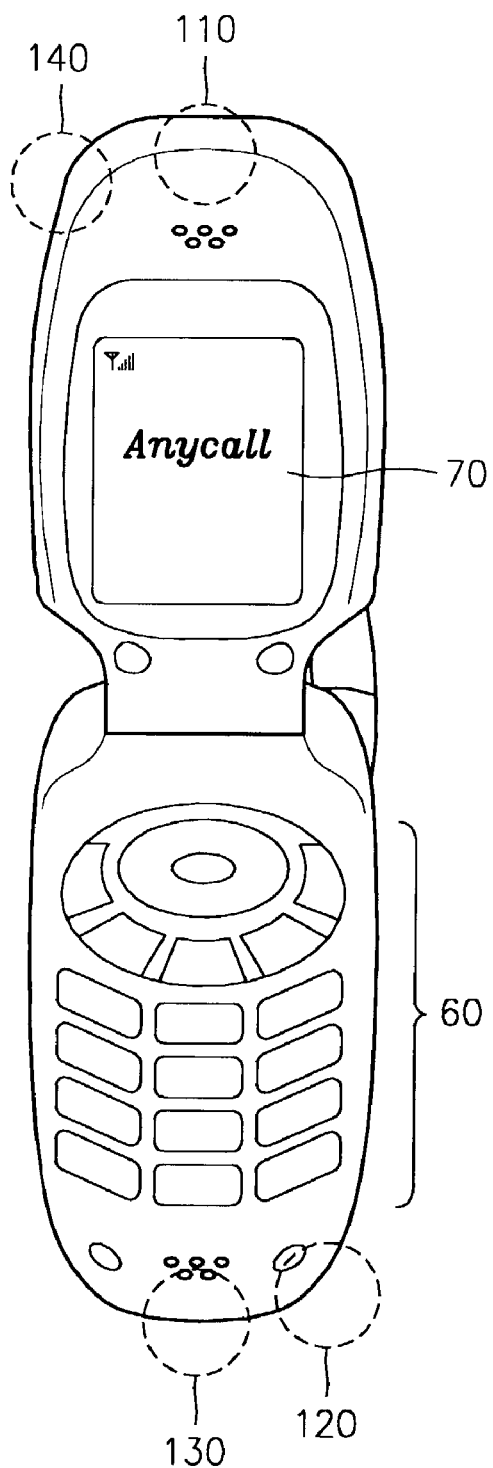
FIG. 1 is a perspective view of a portable telephone according to an embodiment of the present invention.

FIG. 1 is a perspective view of a portable telephone according to an embodiment of the present invention. As shown in FIG. 1, a first speaker 110 and a second microphone 140 are installed in an upper part of the folder type portable telephone. A first microphone 120 corresponding to the first speaker 110 and a second speaker 130 corresponding to the second microphone 140 are installed in a lower part. The first speaker 110 is installed so that the voice of the other party can be readily output when a user's voice is input to the first microphone 120. The second speaker 130 is installed so that the voice of the other party can be readily output when the user's voice is input to the second microphone 140. An input unit 60 is used for requesting to make a call or inputting data into the portable telephone. A display unit 70 is used for displaying a menu for the selection of a function of the portable telephone or displaying the operating state of the portable telephone.

Figure 2:
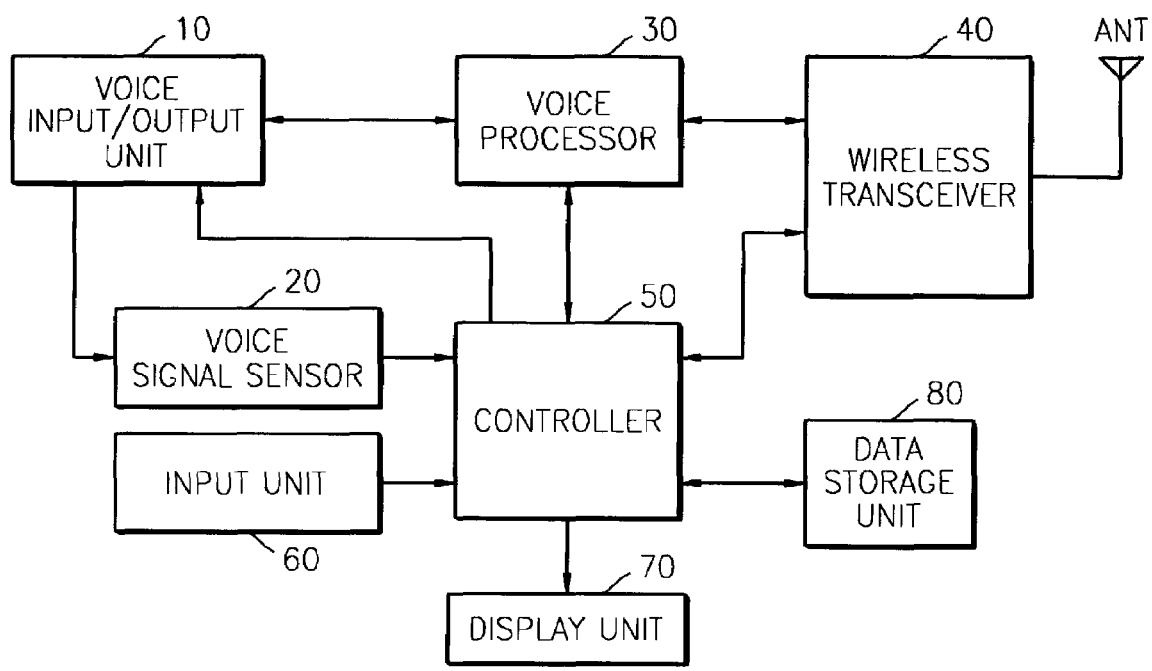
FIG. 2 is a functional block diagram of a portable telephone according to the embodiment of the present invention.

FIG. 2 is a functional block diagram of a portable telephone according to the embodiment of the present invention. The portable telephone includes a voice input/output unit 10, a voice signal sensor 20, a voice processor 30, a wireless transceiver 40, a controller 50, an input unit 60, a display unit 70, and a data storage unit 80.

Referring to FIG. 2, the voice input/output unit 10 includes the first and second speakers 110 and 130, the first and second microphones 120 and 140, and a switching unit 150 (shown in FIG. 3) to input a voice signal and output a voice signal. The voice signal sensor 20 senses voice signals, which are input from the first and second microphones 120 and 140, respectively, included in the voice input/output unit 10. The wireless transceiver 40 transmits a voice signal and receives a voice signal through an antenna. The voice processor 30 processes the voice signal that is received from the voice input/output unit 10 and outputs the processed voice signal to the wireless transceiver 40. The voice processor 30 also processes the voice signal that is received from the wireless transceiver 40 and outputs the processed voice signal to the voice input/output unit 10. The controller 50 controls the first and second speakers 110 and 130 and the first and second microphones 120 and 140, which are included in the voice input/output unit 10, based on a voice signal sensed by the voice signal sensor 20. The input unit 60 is used for requesting to make a call or inputting data into the portable telephone. The display unit 70 is used for displaying a menu for the selection of a function of the portable telephone or displaying the operating state of the portable telephone. The data storage unit 80 stores necessary data, including a basic setting data for controlling the voice input/output unit 10 and a user setting data produced by a user. The basic setting is for setting a paired microphone and speaker that are to be simultaneously enabled among the first and second speakers 110 and 130 and the first and second microphones 120 and 140, which are provided in the voice input/output unit 10, and is usually performed by manufacturers. The user setting is for setting a paired microphone and speaker that are to be simultaneously enabled among the first and second speakers 110 and 130 and the first and second microphones 120 and 140, which are provided in the voice input/output unit 10, and is performed by the user.

Figure 3:
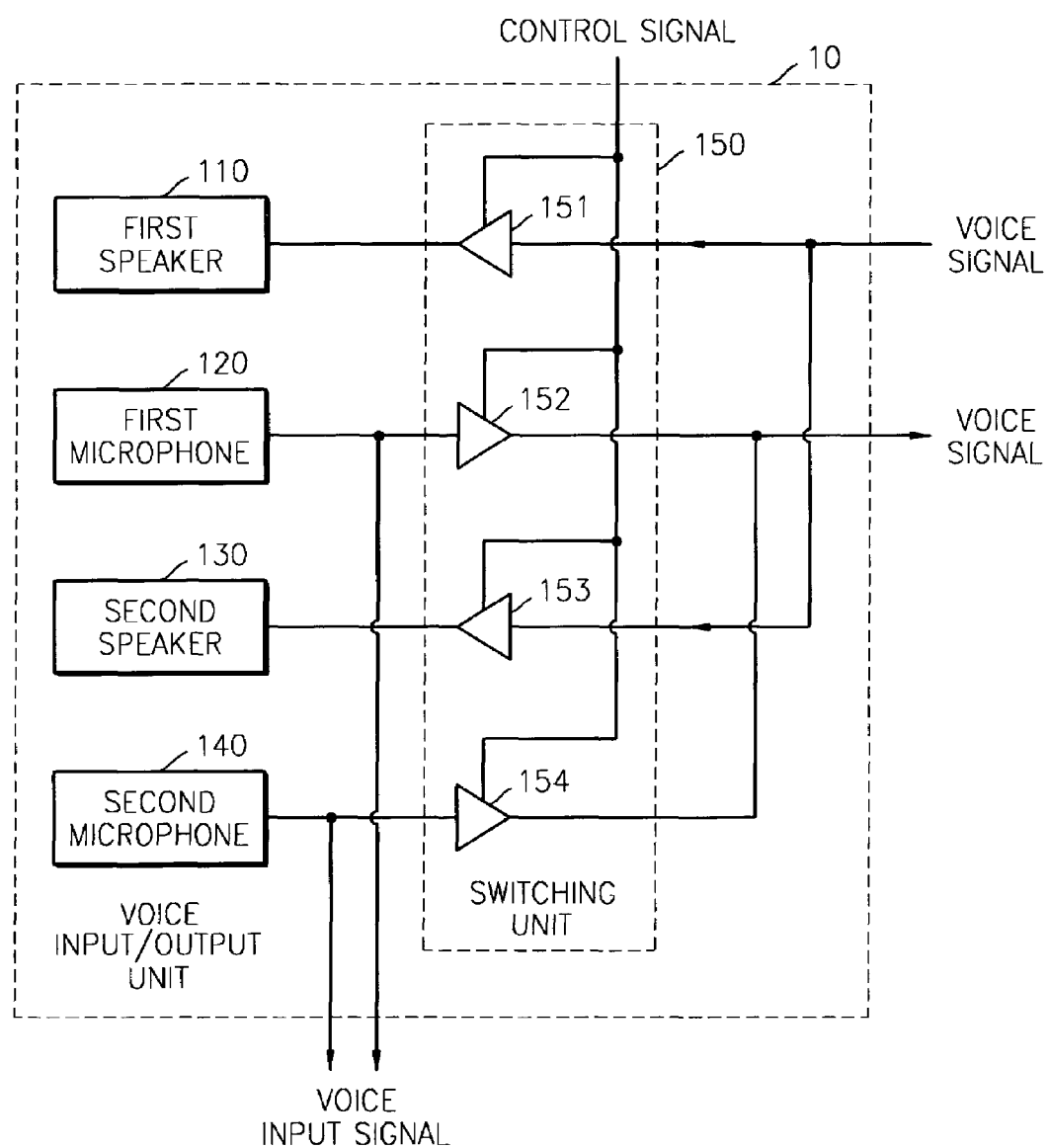
FIG. 3 is a detailed diagram of a voice input/output unit of the portable telephone shown in FIG. 2.

FIG. 3 is a detailed diagram of the voice input/output unit 10 of the portable telephone shown in FIG. 2. The voice input/output unit 10 includes the first speaker 110, the first microphone 120, the second speaker 130, the second microphone 140, and the switching unit 150. Referring to FIG. 3, the first and second speaker 110 and 130 receive a voice signal from the voice processor 40 and output sound. The first and second microphones 120 and 140 are used for receiving the user's voice. The switching unit 150 is composed of as many switching devices 151 through 154 as the number of speakers and microphones. Each of the switching devices 151 through 154 enables or disables the input or output of one of the corresponding first and second speakers 110 and 130 and corresponding first and second microphones 120 and 140 according to a control signal from the controller 50.

Figure 4:
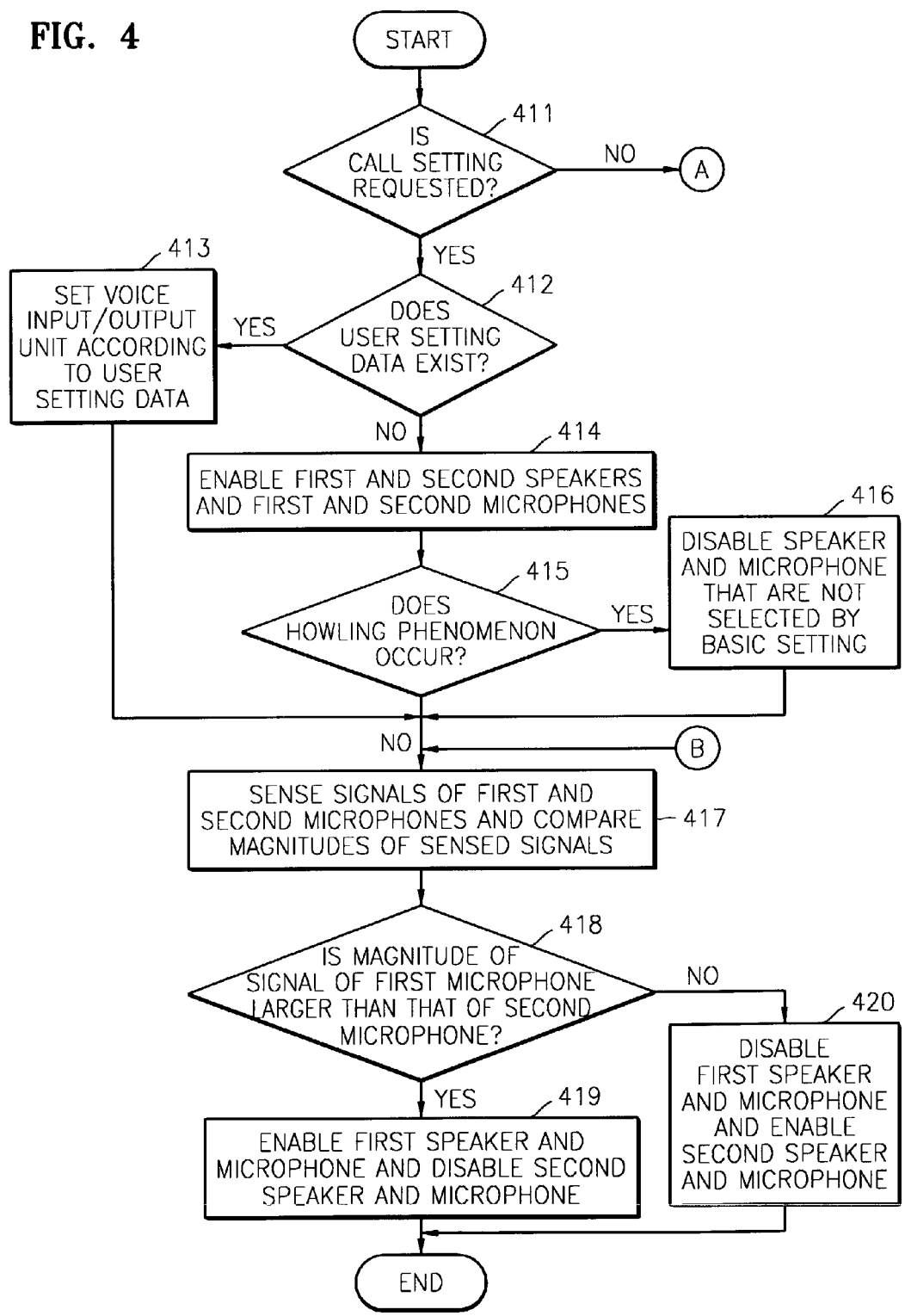
FIG. 4 is a flowchart of a method of controlling a portable telephone according to a first embodiment of the present invention.

FIG. 4 is a flowchart of a method of controlling a portable telephone according to a first embodiment of the present invention. Referring to FIG. 4, the controller 50 determines whether a call setting is requested in step 411. If it is determined that a call setting is requested, the controller 50 determines whether there exists user setting data for enabling and disabling the first and second speakers 110 and 130 and the first and second microphones 120 and 140, which are included in the voice input/output unit 10, in step 412. If it is determined that the user setting data exists, the controller 50 outputs a control signal for controlling the voice input/output unit 10 according to the user setting data to the voice input/output unit 10, and the voice input/output unit 10 enables either a paired first speaker 110 and first microphone 130 or a paired second speaker 120 and second microphone 140 according to the control signal, in step 413. On the contrary, if it is determined that the user setting data does not exist in step 412, the controller 50 outputs a control signal for enabling the first and second speakers 110 and 130 and the first and second microphones 120 and 140 to the voice input/output unit 10, and the voice input/output unit 10 enables the first and second speakers 110 and 130 and the first and second microphones 120 and 140 according to the control signal, in step 414.

Next, the controller 50 determines whether a howling phenomenon occurs in step 415. If it is determined that the howling phenomenon occurs, the controller 50 outputs a control signal for disabling a speaker and a microphone that are not selected by the basic setting to the voice input/output unit 10, and the voice input/output unit 10 disables a paired first speaker and microphone 110 and 130 or a paired second speaker and microphone 120 and 140 according to the control signal, in step 416.

If it is determined that the howling phenomenon does not occur in step 415, the voice signal sensor 20 senses the signals of the respective first and second microphones 120 and 140, and the controller 50 compares the magnitudes of the sensed signals, in step 417. The controller 50 determines whether the magnitude of the signal of the first microphone 120 is larger than that of the second microphone 140 in step 418. If it is determined that the magnitude of the signal of the first microphone 120 is larger, the controller 50 outputs a control signal for disabling the second speaker 130 and microphone 140 to the voice input/output unit 10, and the voice input/output unit 10 disables the second speaker 130 and microphone 140 according to the control signal, in step 419. If it is determined that the magnitude of the signal of the first microphone 120 is smaller than that of the second microphone 140, the controller 50 outputs a control signal for disabling the first speaker 110 and microphone 120 to the voice input/output unit 10, and the voice input/output unit 10 disables the first speaker 110 and microphone 120 according to the control signal, in step 420.

Figure 5:
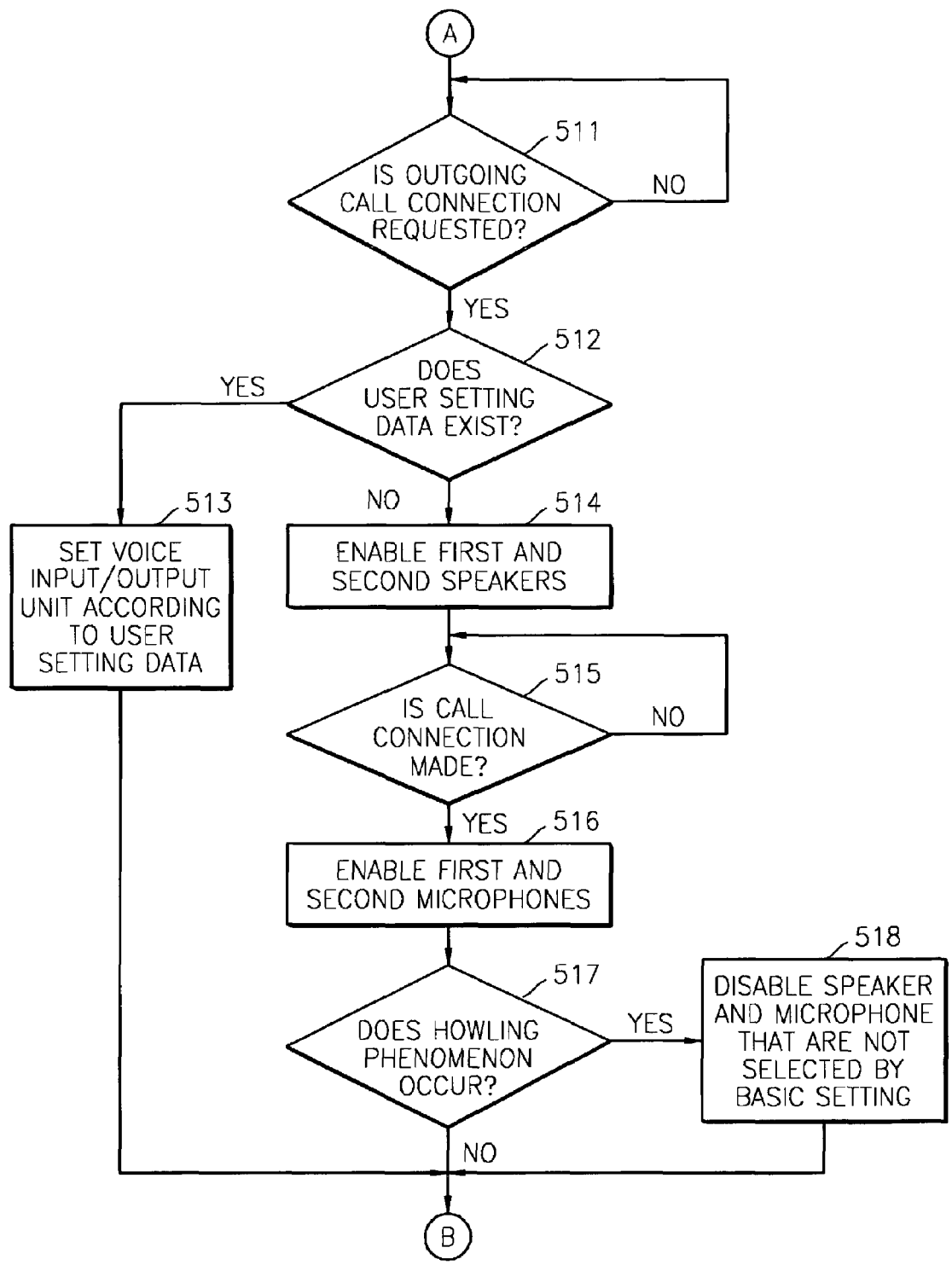
FIG. 5 is a flowchart of a method of controlling a portable telephone according to a second embodiment of the present invention.

FIG. 5 is a flowchart of a method of controlling a portable telephone according to a second embodiment of the present invention. Referring to FIG. 5, the controller 50 determines whether an outgoing call connection is requested by a user in step 511. If it is determined that an outgoing call connection is requested, the controller 50 determines whether there exists user setting data for enabling and disabling the first and second speakers 110 and 130 and the first and second microphones 120 and 140, which are included in the voice input/output unit 10, in step 512. If it is determined that the user setting data exists, the controller 50 outputs a control signal for controlling the voice input/output unit 10 according to the user setting data to the voice input/output unit 10, and the voice input/output unit 10 enables either a pair of the first speaker 110 and the first microphone 130 or a pair of the second speaker 120 and the second microphone 140 according to the control signal, in step 513. On the contrary, if it is determined that the user setting data does not exist in step 512, the controller 50 outputs a control signal for enabling the first and second speakers 110 and 130 to the voice input/output unit 10, and the voice input/output unit 10 enables the first and second speakers 110 and 130 according to the control signal, in step 514.

Next, the controller 50 determines whether the call connection is made in step 515. If it is determined that the call connection is made, the controller 50 outputs a control signal for enabling the first and second microphones 120 and 140 to the voice input/output unit 10, and the voice input/output unit 10 enables the first and second microphones 120 and 140 according to the control signal, in step 516. Subsequently, the controller 50 determines whether a howling phenomenon occurs in step 517. If it is determined that the howling phenomenon occurs, the controller 50 outputs a control signal for disabling a speaker and a microphone that are not selected by the basic setting to the voice input/output unit 10, and the voice input/output unit 10 disables a pair of the first speaker and microphone 110 and 130 or a pair of the second speaker and microphone 120 and 140 according to the control signal, in step 518. If it is determined that the howling phenomenon does not occur in step 517, the steps 417 through 420 shown in FIG. 4 are performed.

In the above embodiment, two pairs of microphones and speakers are provided. However, it will be apparent that the number of pairs of microphones and speakers can be increased when necessary.

A method of controlling a portable telephone according to the present invention can be made into a computer program. Codes and code segments, which constitute the program can be easily inferred by computer programmers in this art. In addition, the program is stored in a computer readable medium, and the control method can be recognized by a computer that is reading and executing the program. The computer readable medium may be a semiconductor memory, a magnetic recording medium, an optical recording medium, or carrier waves.

As described above, by providing a plurality of microphones and speakers for a portable telephone and the functions of sensing, comparing, and controlling the inputs of the microphones, the present invention has the following effects. First, since a conversation can be held over a portable telephone regardless of the position or direction in which a user holds the portable telephone, the user can use the portable telephone conveniently. Second, when the present invention is applied to a folder-type portable telephone, a user can set an upper part and a lower part in the portable telephone for his/her convenience.

This invention is not restricted to the above-described preferred embodiments, and it will be understood by those skilled in the art that various changes in form and details may be made therein without departing from the spirit of the invention. Therefore, the scope of the invention is defined not by the detailed description but by the appended claims.

What is claimed is:

1. A portable telephone comprising:
   a voice input/output unit comprising first and second microphones and first and second speakers, wherein the first microphone and the second speaker are provided in a first portion of the portable telephone, the second microphone and the first speaker are provided in a second portion of the portable telephone which is separate from the first portion, the first microphone and the first speaker form a first paired microphone and speaker and the second microphone and the second speaker form a second paired microphone and speaker;
   a voice signal sensor for sensing voice signals input through the first and second microphones; and
   a controller for enabling outputs of only one of the first paired microphone and speaker and the second paired microphone and speaker based on the sensed voice signals.

2. The portable telephone of claim 1, wherein the the controller enables the outputs of only one of the first paired microphone and speaker and the second paired microphone and speaker based on a magnitude of the sensed voice signals.

3. The portable telephone of claim 2, wherein the controller compares the magnitudes of the sensed voice signals, enables the outputs of the first paired microphone and speaker if the magnitude of the sensed voice signal input through the first microphone is larger than the magnitude of the sensed voice signal input through the second microphone, and enables the outputs of the second microphone and the second speaker if the magnitude of the sensed voice signal input through the second microphone is larger than the magnitude of the sensed voice signal input through the first microphone.

4. The portable telephone of claim 1, wherein the voice input/output unit further comprises a switching unit for enabling or disabling the the first and second paired microphones and speakers according to an on/off signal.

5. A foldable portable telephone having an upper part and a lower part, the foldable portable telephone comprising:
   a voice input/output unit comprising first and second microphones and first and second speakers the first microphone and the second speaker being provided in the lower part and the second microphone and the first speaker being provided in the upper part;
   a voice signal sensor for sensing voice signals input through the first and second microphones; and
   a controller for comparing the magnitudes of the sensed voice signals, enabling the first microphone and the first speaker and disabling the second microphone and the second speaker if a magnitude of the voice signal input through the first microphone is larger than a magnitude of the voice signal input through the second microphone, and enabling the second microphone and the second speaker and disabling the first microphone and the first speaker if the magnitude of the voice signal input through the second microphone is larger than the magnitude of the voice signal input through the first microphone.

6. A method of controlling a portable telephone, the method comprising:
   (a) operating first and second microphones and first and second speakers, wherein the first microphone and the second speaker are provided in a first portion of the portable telephone, the second microphone and the first speaker are provided in a second portion of the portable telephone which is separate from the first portion, the first microphone and the first speaker form a first paired microphone and speaker and the second microphone and the second speaker form a second paired microphone and speaker;
   (b) comparing the magnitudes of voice signals, which are input through the first and second microphones; and (c) enabling outputs of only one of the first paired microphone and speaker and the second paired microphone and speaker based on the result of the comparison.

7. The method of claim 6, further comprising disabling outputs of one of the first paired microphone and speaker and the second paired microphone and speaker, which are not selected according to a basic setting, when a howling phenomenon occurs after the step (a).

8. The method of claim 6, wherein the step (c) comprises enabling the outputs of the first paired microphone and speaker if the magnitude of the voice signal input through the first microphone is larger than the magnitude of the voice signal input through the second microphone, and enabling outputs the second microphone and the second speaker if the magnitude of the voice signal input through the second microphone is larger than the magnitude of the voice signal input through the first microphone.

9. A method of controlling a portable telephone, comprising:
   (a) enabling first and second speakers when an outgoing call connection is requested, the first speaker being provided in an upper part of the portable telephone and the second speaker being provided in a lower part of the portable telephone;
   (b) enabling first and second microphones when the call connection is made, the first microphone being provided in the lower part of the portable telephone and the second microphone being provided in the upper part of the portable telephone;
   (c) sensing and comparing voice signals which are input through the first and second microphones; and
   (d) controlling the outputs of the first and second microphones and the first and second speakers based on the result of the comparison, wherein the first microphone and the first speaker are enabled and the second microphone and the second speaker are disabled if a magnitude of the voice signal input through the first microphone is larger than a magnitude of the voice signal input through the second microphone, and the second microphone and the second speaker are enabled and the first microphone and the first speaker are disabled if the magnitude of the voice signal input through the second microphone is larger than the magnitude of the voice signal input through the first microphone.

10. Method of claim 9, further comprising disabling one of the first and second speakers and one of the first and second microphones, which are not selected according to a basic setting, when a howling phenomenon occurs after the step (b).

11. A recording medium having embodied thereon a computer program for controlling a portable telephone, the program executing the steps of:
   (a) operating first and second microphones and first and second speakers, wherein the first microphone and the second speaker are provided in a first portion of the portable telephone, the second microphone and the first speaker are provided in a second portion of the portable telephone which is separate from the first portion, the first microphone and the first speaker form a first paired microphone and speaker and the second microphone and the second speaker form a second paired microphone and speaker;
   (b) comparing the magnitudes of voice signals, which are input through the first and second microphones; and
   (c) enabling outputs of only one of the first paired microphone and speaker and the second paired microphone and speaker based on the result of the comparison.

12. A recording medium having embodied thereon a computer program for controlling a portable telephone, the program executing the steps of:
   (a) enabling first and second speakers when an outgoing call connection is requested, the first speaker being provided in the upper part of the portable telephone and the second speaker being provided in a lower part of the portable telephone;
   (b) enabling first and second microphones when the call connection is made, the first microphone being provided in the lower part of the portable telephone and the second microphone being provided in the upper part of the portable telephone;
   (c) sensing and comparing voice signals which are input through the first and second microphones; and
   (d) controlling the outputs of the first and second microphones and the first and second speakers based on the result of the comparison, wherein the first microphone and the first speaker are enabled and the second microphone and the second speaker are disabled if a magnitude of the voice signal input through the first microphone is larger than a magnitude of the voice signal input through the second microphone, and the second microphone and the second speaker are enabled and the first microphone and the first speaker are disabled if the magnitude of the voice signal input through the second microphone is larger than the magnitude of the voice signal input through the first microphone.

* * * * *